United States Patent
Rodieck

[11] 3,797,253
[45] Mar. 19, 1974

[54] AUTOMATIC IRRIGATION SYSTEM
[76] Inventor: Chester C. Rodieck, 1596 W. Mells Ln., Anaheim, Calif. 92802
[22] Filed: Jan. 10, 1972
[21] Appl. No.: 216,576

[52] U.S. Cl. .......................................... 61/12, 47/1
[51] Int. Cl. ............................................. E02b 13/00
[58] Field of Search .............. 47/48.5, 1; 61/12, 13; 137/433

[56] References Cited
UNITED STATES PATENTS

| | | | |
|---|---|---|---|
| 2,362,747 | 11/1944 | Duke | 61/12 |
| 499,524 | 6/1893 | Dockery | 61/12 |
| 1,161,745 | 11/1915 | Springman | 137/433 X |
| 1,231,976 | 7/1917 | Weitzel | 137/433 X |
| 1,758,941 | 5/1930 | Gibson | 61/13 |
| 2,684,077 | 7/1954 | Shaffer | 61/12 X |
| 2,896,904 | 7/1959 | Northup | 61/12 X |

*Primary Examiner*—Mervin Stein
*Assistant Examiner*—David H. Corbin
*Attorney, Agent, or Firm*—Dominick Nardelli; Edward Dugas

[57] ABSTRACT

The irrigation system is comprised of a plurality of valves with each valve connected by means of piping to a pressurized water source. Each item to be watered is provided with a well around its base and at least one valve is positioned within each of the wells. One or more risers, of preselected height, are provided in said piping so as to force each valve that has been closed, by the water reaching a preselected height in the well, to remain closed for so long as there is water pressure applied to the system.

10 Claims, 5 Drawing Figures

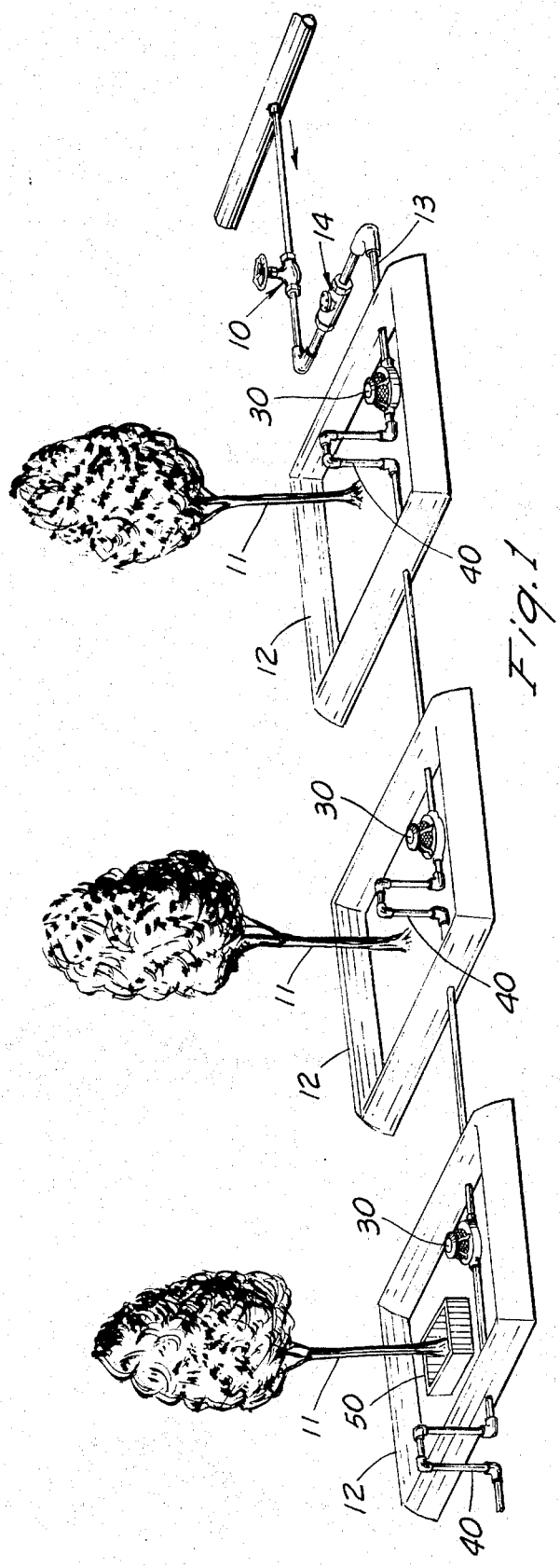
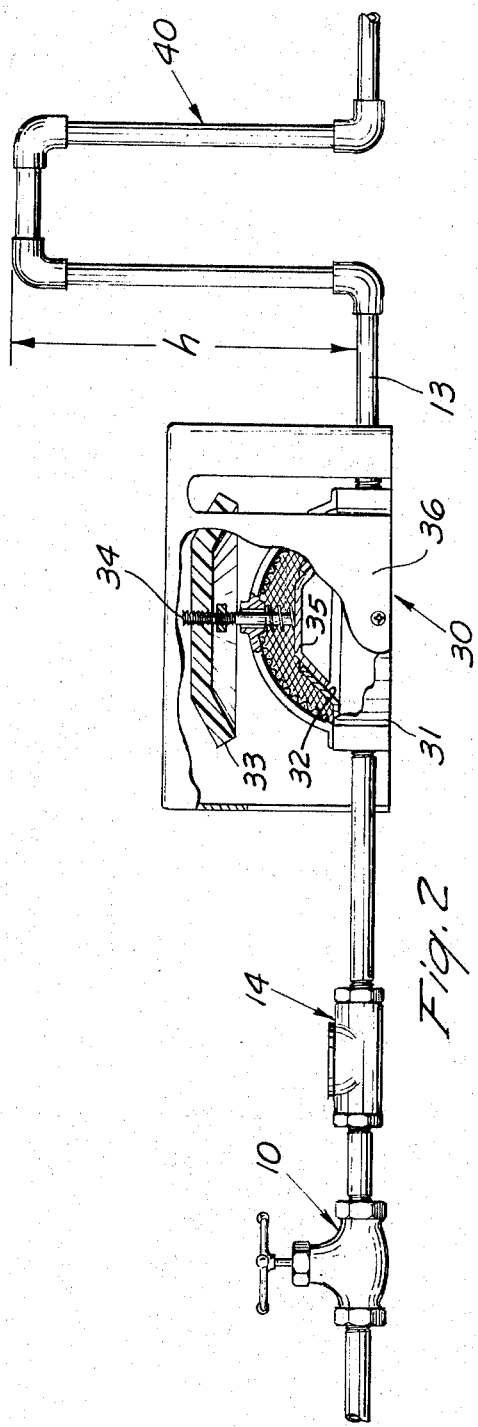

AUTOMATIC IRRIGATION SYSTEM

BACKGROUND OF THE INVENTION

Irrigation systems have been in use for many years to provide plants, trees, and other items with water. Water is delivered to the plants by means of ditches, hoses, sprayers, pipes, and in drastic situations by hand.

The biggest problem that exists with prior art systems is that of waste caused by run-off. For example, if the terrain is not flat water will run from high points and accumulate in the low spots. Low lying plants will therefore receive more than their share of water, while plants on high ground will be starved. On flat ground the water may be evenly distributed but the systems' operator may leave the water on too long to again cause a waste of water.

Large orchards use one or more sprinklers to water rows of trees. The sprinklers soak the ground in an irregular pattern, therefore some trees receive more water then others which results in irregular growth patterns.

One prior art patent, U.S. Pat. No. 3,293,799, entitled "Automatic Irrigation of Pot Cultures in Plant Growth Rooms and Greenhouses" by G. F. Keller et al, attempts to solve the problem in a limited area by utilizing the weight of the plant combined with the soil and pot to activate a water source when the moisture content of the soil diminishes below an allowed value. As water is fed to the soil the weight of the entire assemblage increases to shut off the water source. This prior art device cannot be used on large orchards and by its very complexity is necessarily expensive.

Another prior art device is disclosed in U.S. Pat. No. 1,231,976, entitled "Regulator for Flower Pot Watering devices" by P. R. Weitzel 2nd. The watering device of that prior art patent uses a circular closed tank as a water source. The water from the tank is released into a second tank thru a float valve. The main function of the float valve is to keep the water in the second tank always at a constant level. The constant water level insures a constant pressure at a metering valve, which metering valve is used to meter the water at a controlled rate from the second tank to the plant located below the entire assembly. Water will continue to flow to the plant for so long as there is water in the second tank.

Again, this prior art device is limited in that it cannot easily be used to irrigate orchards, fields, and other large plant growing areas.

Another prior art patent of interest is U.S. Pat. No. 2,648,077, entitled "Irrigation Control Valve" by S. E. Shaffer. In that patent, a float is connected to the end of a hose by means of a disk and a rod. When the water is first turned on, the float is in the downward position, canting the disk within the hose to allow water to flow from the hose. As the float rises the disk blocks the end of the hose cutting off the water supply. The disk is then held in this position, by water pressure, even though the water level which raised the float goes down. When the water pressure is turned off the float then moves down draining the hose and the device is ready for the next watering cycle. To adjust the water level with this prior art device, the entire assembly has to be moved up or down and/or the rod holding the float has to be bent to position the float so that it closes the disk in the hose at the proper water level.

Applicants' system eliminates the shortcomings of the prior art devices in that it can be used in an irrigation basin, is easily adjustable in both the flow rate and the level of water in the basin. Once the system is turned on, the operator can leave with the knowledge that each basin will receive only the selected amount of water and that the system will turn itself off at each basin when the selected requirements are met.

SUMMARY OF THE INVENTION

The present invention is comprised of at least one float activated valve positioned within an irrigation basin, said valve being normally open when the water level in the basin has not reached the level of the float. A control valve connects a source of water under pressure to the float activated valve thru piping, which piping includes at least one full flow riser section. The height of the riser is arrived at by determining the pressure of the water source and the weight of the water in the riser, which weight when coupled with the water pressure in the pipes creates enough force to hold the valve in a closed position after the float initially closes the valve, even though the water level at the float falls below that which raised the float. Water flow thru the piping and valve causes friction losses which in turn diminishes the pressure available at the valve to hold the valve closed. Each full flow riser, therefore, must be of sufficient height to compensate for this pressure loss.

BRIEF DESCRIPTION OF THE DRAWINGS

FIG. 1 is a prospective view showing the irrigation system in place in an orchard;

FIG. 2 is a partially sectioned view illustrating a float activated valve affixed in place in the system;

DESCRIPTION OF THE PREFERRED EMBODIMENTS

Figure 3:
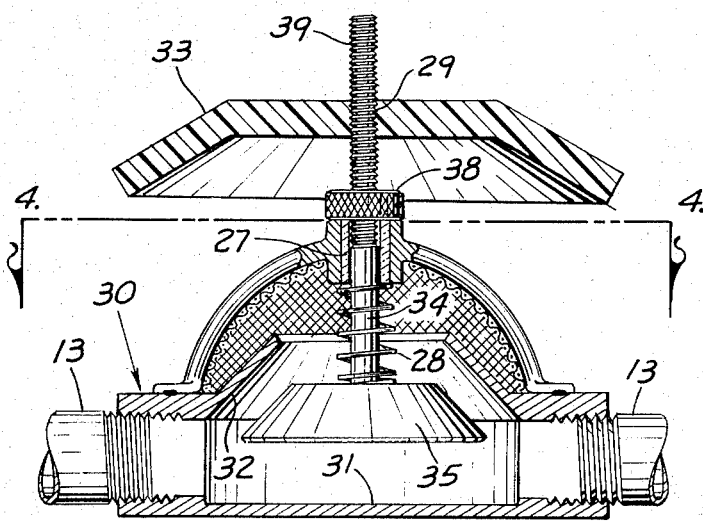
FIG. 3 is an enlarged sectioned side view of the float activated valve of FIG. 2.

Referring to FIG. 1, a master valve 10 has its inlet side connected to a pressurized source of water which is not shown for clarity. The outlet side of the master valve is connected to piping 13. Inserted at selected intervals in piping 13 are full flow riser sections 40. The piping 13 is routed near a plurality of trees 11, each of which is surrounded by an irrigation basin 12. Located within each basin and connected to the piping 13 are a plurality of float operated valves 30. Although one valve is shown at each tree, it would be obvious to place either two or more valves within each basin and to include more than one tree in a basin. A second basin 50 can be affixed around the trunk of the tree to keep the water from coming into direct contact with the tree in order to prevent rot. A high-low pressure valve 14 can be inserted into the line after the master valve 10. The purpose of this valve is to close the line if the pressure should drop below a known value. Such a drop would be occasioned if one of the lines should rupture. The high pressure will close the valve, and hold it shut, when all the float valves have been closed and the line pressure approaches the pressure of the source.

Referring to FIG. 2, the float valve 30 is comprised of a body member 31 with a circular flange shaped opening 32. A truncated cone shaped gate member 35 fits snugly against the inner surface of flange 32 to provide a water-tight seal in the closed position. A shaft 34 is connected at one end of body member 35 and at its other end to a float 33. A cover 36 protects the float mechanism from vandals, falling leaves and other debris.

In operation, referring to FIG. 1 in conjunction with FIG. 2, before the master valve 10 is opened, the weight of each float, body member 35 and shaft 34 causes the body member to move downward to provide an opening between the mating surfaces of body member 35 and the circular flange 32. When the master valve 10 is opened, water flows from the open valve 30 filling the basin 12 around each tree. When the water level reaches a pre-set level, which level is determined by the height of the float in the basin, the body member (gate) 35 seats against flange 32 to shut the valve off.

Once the water stops flowing into the basin, the water level in the basin begins to drop and the float no longer holds the gate seated. Instead the pressure of the water in the piping 13 coupled with the additional pressure generated by the weight of the liquid in the riser 40 holds the valve gate shut. After the watering is completed, since all float valves are shut off, one is free to close the master valve 10. Since the water pressure from the source is removed, the float valve will open provided the water in the basin has seeped into the ground. The system is ready for the next time irrigation The height of riser 40 must be such that the pressure of the water in the riser combined with the pressure of the systems water supply is greater than the pressure exerted by the weight of the float assembly as transmitted by the area of the valve gate 35 exposed to the water pressure. If the systems pressure water source varies considerably then it is necessary to insert a pressure regulator into the line in order to maintain the pressure constant.

Figure 4:
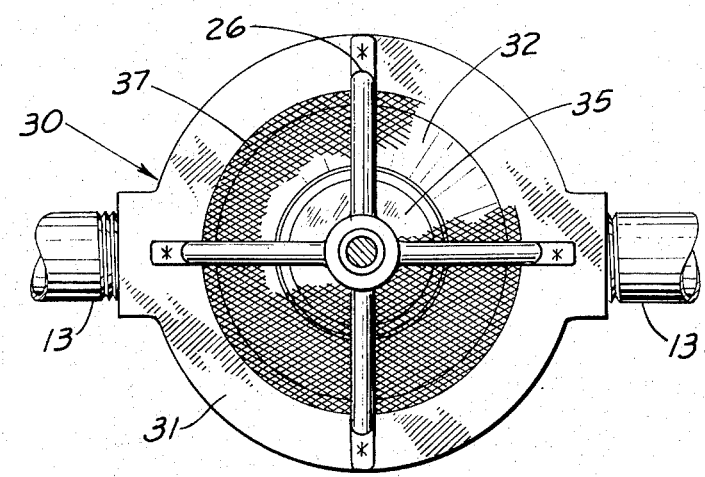
FIG. 4 is a partially sectioned top view of the float activated valve as shown in FIG. 3 taken along the section lines 4—4.

In FIGS. 3 and 4, the float activated valve 30 is shown in more detail and in the open position. The body member 31 is taped at both ends to receive piping 13. The circular flange 32 extending upwardly at an angle from body member 31 forms a water-tight mating surface with the cone shaped gate member 35 when the gate member is in the uppermost position. Rigid semicircular arms 26 project upward from the body member to meet along an axis defined by the shaft 34. The body members form a bushing surface 27 for shaft 34, allowing it to move in the vertical direction. The uppermost end of shaft 34 is threaded. On the threaded section of the shaft there is mounted a knurled opening adjusting nut 38. The desired rate of flow can be achieved by adjusting nut 38, so as to vary the clearances between flange 32 and gate member 35. Further along shaft 34 is mounted, by means of threads 29, a float member 33. The float member can be adjusted in height by rotating it on the shaft 34.

A fine screening 37 can be positioned between the semi-circular arms 26 to act as both an aerator and a leaf protector. In some applications where light materials, such as plastic, are used to make the moving parts of valve 30 it may be necessary to add a spring 34 between the gate body 35 and the arms 26 for the purpose of forcing the gate body open against a relatively low water pressure.

Figure 5:
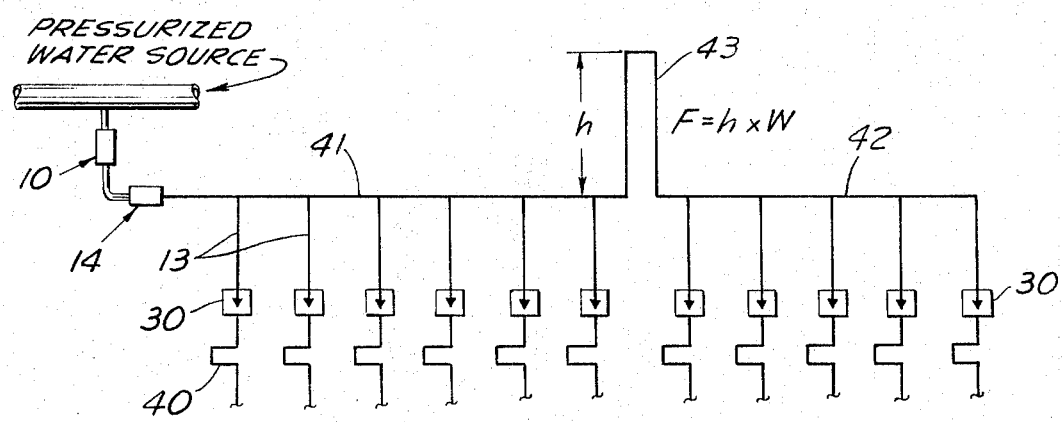
FIG. 5 is a schematic view of a second embodiment of the irrigation system.

Referring to FIG. 5, the irrigation system is shown using two banks of five rows each. One bank is fed by a supply line 41 and the other by supply lines 41 and 42. A full flow riser 43 separates supply lines 41 and 42 into two banks. In operation when the system is first turned on all the valves 30 are open. Water flows from line 41 thru each of the feeder lines 13. The height of riser 40 is fixed such that the pressure in line 41 is not great enough to force water thru riser 43 when the valves 30 are open. When all the valves 30, fed by line 41, are closed, the pressure builds up towards the line pressure forcing water thru riser 43 into supply line 42 and the cycle repeats itself. When all the valves associated with supply line 42 are closed the pressure in the system again builds towards the line pressure. When the pressure reaches the line pressure, or slightly below, the high-low pressure valve 14 closes cutting off the water pressure. Each valve 30 then opens draining the system thereby resetting it for another cycle.

Although only one riser 43 is shown, it is obvious that additional risers and supply lines such as 41 and 42 can be used to feed many rows of feeder lines 13, all of which can be operated in an automatic manner without an operator in attendance.

Although there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

I claim:

1. An irrigation system for use in combination with a plurality of spaced irrigation basins, said system comprising:

a water supply system supplying water under pressure;

a pipe line means coupled to said water supply system disposed to pass into and out of each of said basins in turn;

a plurality of valve means, each disposed in a respective basin and coupled to said pipe line means;

said valve means having an entrance opening through which water enters from said pipe line means;

a first exit opening through which water exits said valve means to enter said basin; and a second exit opening through which water exits said valve means to re-enter said pipe line means to flow to the next basin;

said valve means including gate means for preventing water from exiting said first opening; said valve means further including a float means coupled to said gate means and responsive to the water level in said respective basins to actuate said gate means whenever said water reaches a predetermined level in said respective basins to close said first opening; and means disposed on the downstream side of said valve means and adapted to prevent water from exiting from said second opening whenever said first opening is opened;

said gate means being further responsive to said water pressure within said pipe line means to maintain said first opening closed after it has been closed.

2. The system of claim 1 wherein:

said float means includes a float responsive to the water level in the respective basin;

said gate means includes a gate member disposed within said valve means so that when said gate member is against said first opening the water pressure therein tends to urge said member thereagainst to keep the first opening shut; and a rod passing through the opening to connect said gate member to aid float so that the weight of said float urges the member away from said first opening and the buoyancy of said float lifts the member towards the said first opening.

3. The system of claim 2 wherein:

said means disposed on the downstream side of said valve means includes a U-shaped pipe so that the water first rises and then descends.

4. The system of claim 1 wherein said valve means include:

a hollow body disposed in each basin and having a circular flange port forming said first opening and said pipe line means communicating with said body;

said gate means including a truncated cone-shaped gate portion within said hollow body with the outer surface of said gate mating with said circular flange portion in a closed position to provide a substantially water-tight seal;

said float means including a float disposed outside the body and a rod connecting said gate to said float so that the water level within the basin urges the float upward to urge said gate to close said first opening.

5. The system of claim 4 wherein said means disposed on the downstream side of said valve means includes a U-shaped pipe so that the water first rises and then descends.

6. The irrigation system according to claim 15 wherein said truncated cone shaped gate means displays to said water pressure a surface area sufficiently large to maintain said gate in a closed position once the float has closed the gate.

7. The irrigation system according to claim 6 and further comprising:

a. spring means for forcing said gate member into an open position when water pressure within said body member is below a predetermined level.

8. An irrigation system for use in irrigation basins comprised in combination:

a pressurized water source, a supply line connected to said pressurized source of water;

at least one full flow bank U-shaped riser interposed in said supply line so that the water first rises and then falls and dividing said line into banks;

a plurality of feeder lines connected to each formed bank of said supply line, said feeder line being disposed in rows with said feeder line disposed to pass through each irrigation basin;

a plurality of float activated valve means inserted in said feeder lines, at least one in each of said irrigation basins, and having an opening to allow water to flow into said respective basins, said valve means including a gate means and a float means, said float means being disposed to rise a sufficient distance when the water level in said basin rises to a select level to cause the gate means of said valve means to close said respective opening;

at least one full flow feeder line U-shaped riser connected within each of said feeder lines with the height of said feeder line riser being higher than said respective opening of said valve means to hold a head of water of sufficient height such that the water pressure developed at the gate means of said valve means is sufficient to maintain said gate means against said opening once it has been closed by the float action;

the height of said bank riser being higher than any of said feeder line risers to hold a head of water of sufficient height such that the pressure of the water in said bank riser prevents the flow of water into the next bank of said supply line until the valve means of a preceding bank are substantially all closed.

9. The irrigation system according to claim 8, wherein said float activated valve means is comprised of:

a. a hollow body member having a circular flange part;

b. said gate means including a truncated cone shaped gate member positioned within said hollow body member with the outer surface of said gate member mating with said circular flange part, in the closed position, to provide a water-tight seal;

c. said float means having a float member and a rod connected to said gate member and said float member to urge said gate member to a closed position when the water level in said basin rises above the selected level.

10. The irrigation system according to claim 8 and further comprising:

a. a high-low pressure valve converting said supply line to said pressurized source of water, said pressure valve closing when the pressure in said supply line is substantially the same pressure as said pressurized source of water, and closing when the pressure in said supply line is so low as to indicate a rupture in the irrigation system.

* * * * *